(12) United States Patent
Skaff

(10) Patent No.: US 8,205,694 B2
(45) Date of Patent: Jun. 26, 2012

(54) METHOD OF GENERATING A PROPAGATION GAIT FOR A ROBOT

(75) Inventor: Sarjoun Skaff, Pittsburgh, PA (US)

(73) Assignee: Bossa Nova Robotics IP, Inc., Pittsburgh, PA (US)

(*) Notice: Subject to any disclaimer, the term of this patent is extended or adjusted under 35 U.S.C. 154(b) by 0 days.

(21) Appl. No.: 13/118,950

(22) Filed: May 31, 2011

(65) Prior Publication Data

US 2011/0240381 A1 Oct. 6, 2011

(51) Int. Cl.
*B62D 57/02* (2006.01)
(52) U.S. Cl. .......................... 180/8.1; 180/8.6
(58) Field of Classification Search ............... 180/8.1, 180/8.4, 8.6, 8.7
See application file for complete search history.

(56) References Cited

U.S. PATENT DOCUMENTS

| | | | | |
|---|---|---|---|---|
| 2,918,738 A | * | 12/1959 | Barr | 37/347 |
| 3,850,259 A | * | 11/1974 | Ikeda et al. | 180/8.6 |
| 4,862,980 A | * | 9/1989 | Shkolnik | 180/8.2 |
| 5,158,493 A | * | 10/1992 | Morgrey | 446/355 |
| 7,464,775 B2 | * | 12/2008 | Clemens et al. | 180/8.3 |

* cited by examiner

*Primary Examiner* — Kevin Hurley
(74) *Attorney, Agent, or Firm* — Eckert Seamans Cherin & Mellott, LLC; Stephen A. Bucchianeri

(57) ABSTRACT

The method and apparatus consist of a robot body having at least two, but preferably six appendages. The appendages are organized into appendage groups of one to six appendages. The appendages are linked mechanically into groups of two or more and each group is actuated using a single drive actuator. A selective engagement mechanism is used to selectively engaged and disengage one or more appendages at a time in a way that allows for at least one appendage and at most all but one appendage per group to be engaged to a group's drive actuator. When the appendage is disengaged it is preferably locked in place to resist a reasonable force applied to them externally, such as the force equivalent to the weight of the robot.

7 Claims, 8 Drawing Sheets

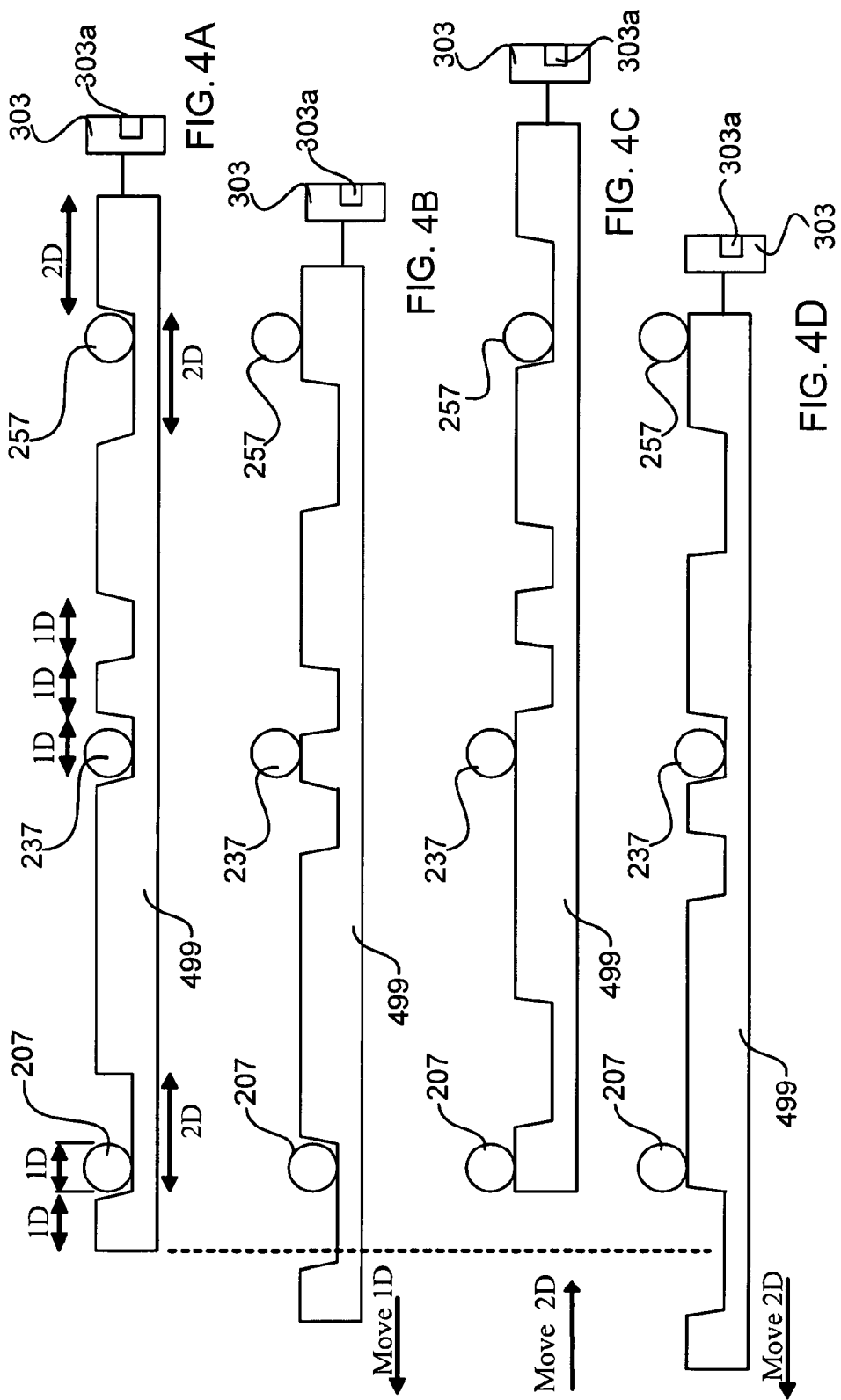

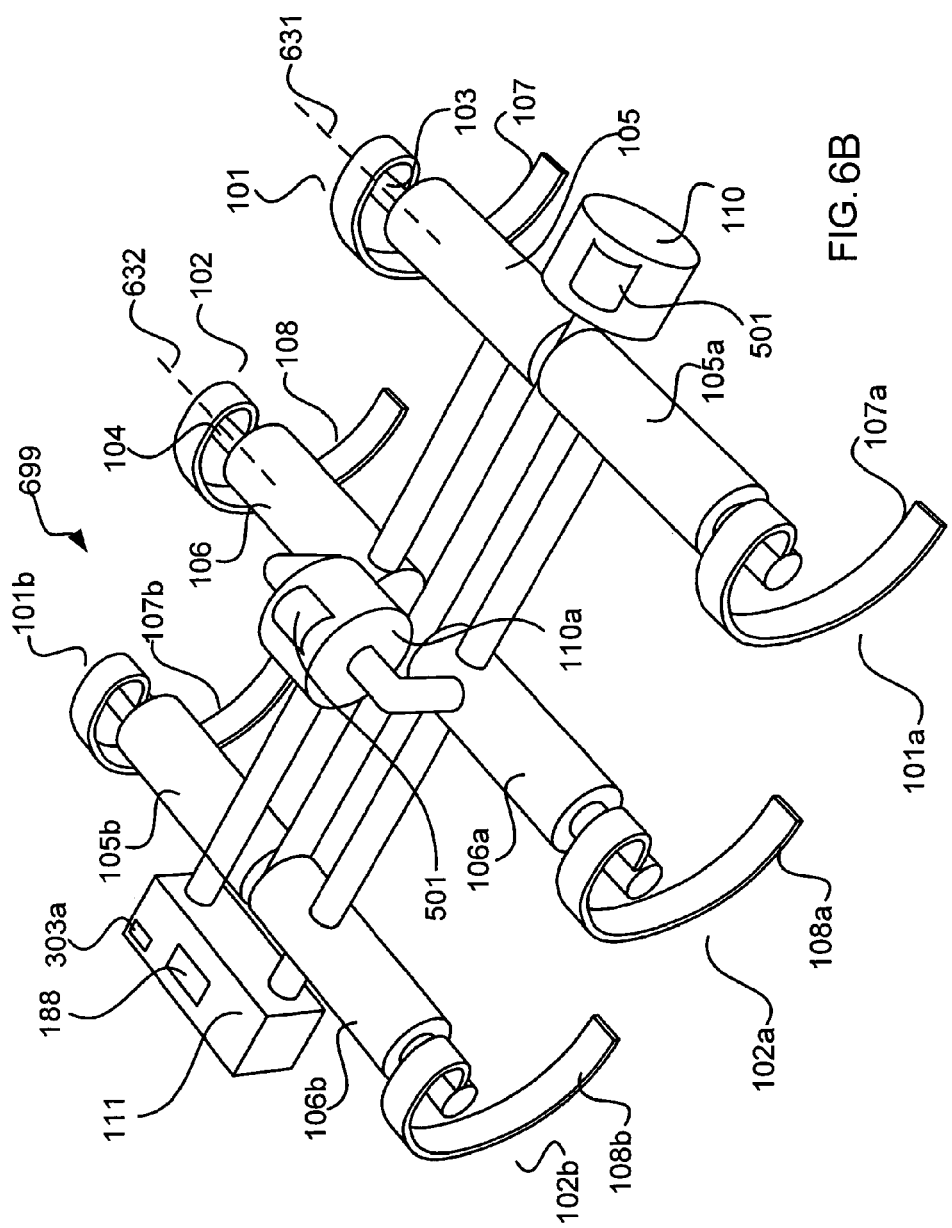

METHOD OF GENERATING A PROPAGATION GAIT FOR A ROBOT

CROSS REFERENCE TO RELATED APPLICATION

This application claims priority from U.S. patent application Ser. No. 12/406,625 filed on Mar. 18, 2009, which claims priority to U.S. Provisional Application No. 61/037,692 filed on Mar. 18, 2008, the disclosure of which is incorporated herein by reference.

BACKGROUND

1. Field of the Invention

The field of the invention relates to a robot platform and more specifically to a legged and reconfigurable robot platform.

2. Background Information

Manufacturing costs of products are rising. Both actuators and sensors are known to be expensive components. As such, reducing the number of sensors and actuators in a robot platform is advantageous for products that are being sold to consumers.

In terms of the Prior Art, U.S. Pat. No. 6,481,513 discloses a mobile robot comprising a body and at least six compliant legs each having only one actuator. Unfortunately, because each compliant leg has an actuatuator, it increases power consumption of the robot as well as the cost. When each actuator utilizes electrical power, therefore, the more actuators that are used within a design the higher will be the power consumption of the robot.

It is therefore an object of the present invention to provide a robot that overcomes the aforementioned deficiencies.

SUMMARY OF THE INVENTION

In accordance with the invention there is provided a robot comprising: a housing having an interior surface and an exterior surface, a first appendage assembly rotatably coupled to the housing, the first appendage assembly comprising a first appendage and a first appendage gear; a second appendage assembly rotatably coupled to the housing, the second appendage assembly comprising a second appendage and a second appendage gear; a first drive actuator selectively coupled with the first and second appendage assemblies, the first drive actuator being selectively coupled with the first and second appendage assemblies; a first clutch mechanism coupled with the first appendage assembly and a second clutch mechanism coupled with the second appendage assembly, wherein each clutch mechanism is for operating in an engaged mode of operation for selectively coupling of the first drive actuator to a respective appendage assembly for providing actuation thereto and for operating in a disengaged mode of operation for selectively uncoupling of the first drive actuator from the respective appendage assembly; and, a selective engagement mechanism coupled with the first clutch mechanism and the second clutch mechanism for selecting one of the engaged mode of operation and the disengaged mode of operation for each clutch mechanism.

In accordance with the invention there is provided a robot comprising: a housing having an interior surface and an exterior surface, a first appendage assembly rotatably coupled to the housing, the first appendage assembly comprising a first appendage and a first appendage gear; a second appendage assembly rotatably coupled to the housing, the second appendage assembly comprising a second appendage and a second appendage gear; a first drive actuator selectively coupled with the first and second appendage assemblies, the first drive actuator being selectively coupled with the first and second appendage assemblies; a selective engagement mechanism comprising: one of a linear slider and at least one engagement gear; and a selective engagement mechanism actuator for positioning the one of a linear slider and at least one engagement gear and, the selective engagement mechanism actuator for operating in a plurality of engagement states, wherein each engagement state is determined by the position of the one of a linear slider and at least one engagement gear; a first clutch mechanism coupled with the first appendage assembly and the selective engagement mechanism and a second clutch mechanism coupled with the second appendage assembly and the selective engagement mechanism, wherein each clutch mechanism is for operating in an engaged mode of operation for selectively coupling of the first drive actuator to a respective appendage assembly for providing actuation thereto and for operating in a disengaged mode of operation for selectively uncoupling of the first drive actuator from the respective appendage assembly, wherein the position of the selective engagement mechanism actuator determines the position of the one of a linear slider and at least one engagement gear for at least one of engaging at least one of the first and second clutch mechanisms and disengaging at least one of the first and second clutch mechanisms.

In accordance with the invention there is provided a method of generating a propagation gait for a robot comprising: providing a housing having an interior surface and an exterior surface; providing a first appendage assembly rotatably coupled to the housing; providing a second appendage assembly rotatably coupled to the housing, providing a first drive actuator; coupling of the first drive actuator to the first appendage assembly; rotating of the first appendage assembly to set a first absolute position; coupling of the first drive actuator to the second appendage assembly; rotating of the second appendage assembly to set a second absolute position; coupling of the first and second appendage assemblies to the first drive actuator; rotating of both the first and second appendage assemblies.

BRIEF DESCRIPTION OF THE DRAWINGS

Exemplary embodiments of the invention will now be described in conjunction with the following drawings, in which:

FIGS. 4A through 4D illustrated a selective engagement mechanism that operates using a linear slider for actuating of three clutch mechanisms;

FIG. 6B illustrates a robot 699 in accordance with a fourth embodiment of the invention.

DESCRIPTION OF EMBODIMENTS OF THE INVENTION

Figure 1A:
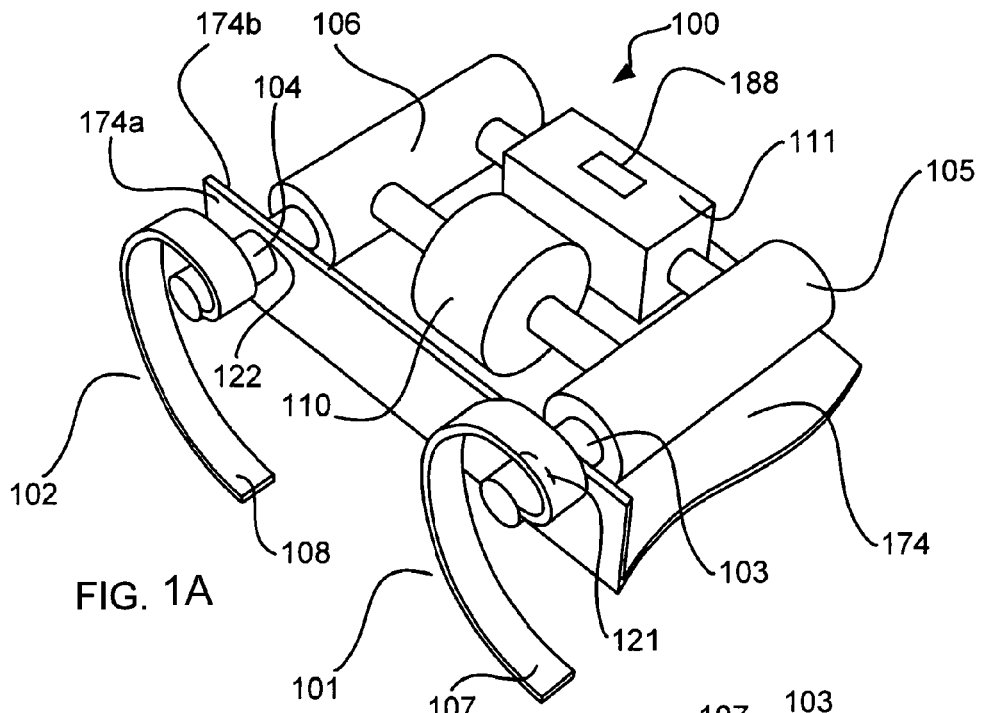
FIG. 1A illustrates a perspective view of a portion of a legged robot in accordance with a first embodiment of the invention.

FIG. 1a illustrates a perspective view of a portion of a legged robot 100 in accordance with a first embodiment of the invention. Forming the robot 100 is a first appendage assembly 101, which includes a first appendage 107 and a first appendage gear 103. The first appendage gear 103 extends from within a first clutch mechanism 105 and is coupled with the first appendage 107 for actuating thereof. A second appendage assembly 102, which includes a second appendage 108 and a second appendage gear 104. The second appendage gear 104 extends from within a second clutch mechanism 106 and is coupled with the second appendage 108.

A first drive actuator 110 is coupled with the first and second clutch mechanisms, 105 and 106, for being selectively coupled with the first and second appendage assemblies, 101 and 102. Each clutch mechanism 105 and 106 operates in one of an engaged mode of operation and a disengaged mode of operation. In the engaged mode of operation for the first clutch mechanism 105, the first drive actuator 110 is coupled with the first appendage 107 for actuating thereof by the first actuator 110. In the engaged mode of operation for the second clutch mechanism 106 the first drive actuator 110 is coupled with the second appendage 108 for actuating thereof by the first actuator 110.

With respect to the disengaged mode of operation for the first clutch mechanism 105, the first drive actuator 110 is uncoupled with the first appendage 107 for other than actuating thereof by the first actuator 110. In the disengaged mode of operation for the second clutch mechanism 106 the first drive actuator 110 is uncoupled with the second appendage 108 for other than actuating thereof by the first actuator 110.

Controlling the mode of operation of each clutch mechanism 105 and 106 is a selective engagement mechanism 111, which is coupled to the first clutch mechanism 105 and the second clutch mechanism 106 for selecting one of the engaged mode of operation and the disengaged mode of operation in response to a selective engagement control signal. For the purpose of this disclosure, the operation of the first clutch mechanism 105 will be described in detail hereinbelow. The operation of the second clutch mechanism 106 is identical to that of the first clutch mechanism 107 and hence will not be described in detail.

Figure 3A:
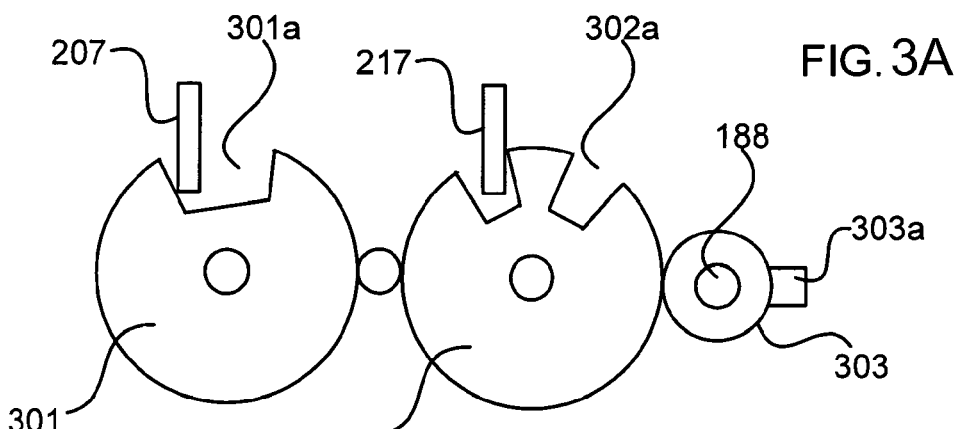
FIG. 3A illustrates a selective engagement mechanism in a first state and having two engagement gears.

A selective engagement mechanism position sensor 188 is coupled with the selective engagement mechanism 111 for sensing an absolute position of the selective engagement mechanism and for providing a clutch engagement data in dependence upon its absolute position. Each absolute position of the selective engagement mechanism results in a different combination of clutch mechanisms that are in the engaged mode of operation and clutch mechanisms that are in the disengaged mode of operation. In the case where there are two clutch mechanisms (such as shown in FIG. 1a), the clutch engagement data encodes for one of four engagement states of selective engagement. An example of the four engagement states is shown in FIGS. 3a through to 3d, where each figure illustrates a different engagement state. In the case where there are three clutch mechanisms, the clutch engagement data encodes for at least one of four engagement states and less than or equal to 8 engagement states. Each of the encoded engagement states is unique. In the case where there are N clutch mechanisms, then there are less than $2^N$ engagement states.

Forming a body of the first embodiment of the invention 100 is a housing 174, the housing 174 has an interior surface 174a and an exterior surface 174b. At least a portion of the first appendage gear 103 extends beyond the exterior surface of the housing 174a for rotating within a first aperture 121 formed within the housing 174. At least a portion of the second appendage gear 104 extends beyond the exterior surface of the housing 174a for rotating within a second aperture 122, which is formed within the housing 174. The first appendage gear 103 comprises a first appendage gear first portion 103a (FIG. 2a) proximate the exterior surface of the housing 174b and a first appendage gear second portion 103b proximate the interior surface of the housing 174a, where the first appendage gear first portion 103a preferably comprises other than gear teeth and is coupled with the first appendage 107. The first appendage second portion 103b comprises gear teeth.

For the first embodiment of the invention 100, the first and second appendage assemblies, 101 and 102 are found on a same side of the housing 174, where rotational axes (not shown) of the first and second appendage gears 103 and 104 are in approximately parallel axes.

Figure 1B:
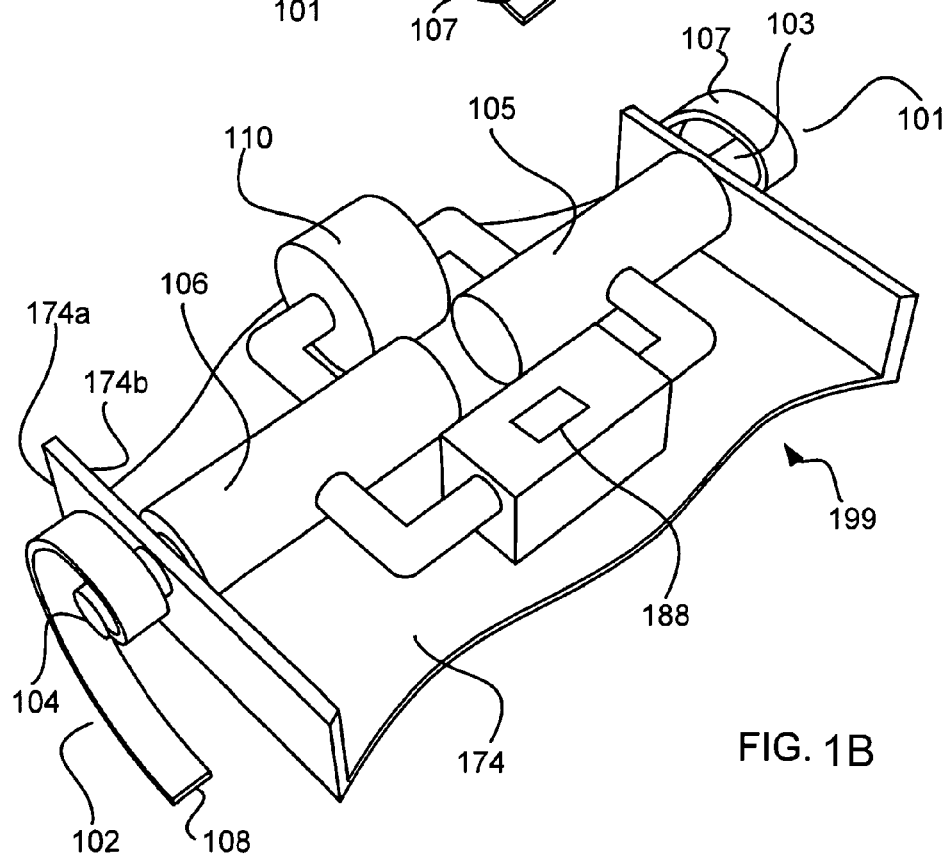
FIG. 1B illustrates a portion of legged robot as a second embodiment of the invention.

FIG. 1b illustrates a portion of legged robot 199 as a second embodiment of the invention. In this case, the first and second appendage assemblies 101 and 102 are found on opposite sides of the housing 174, where rotational axes (not shown) of the first and second appendage gears 103 and 104 are approximately coaxial with each other.

Figure 2A:
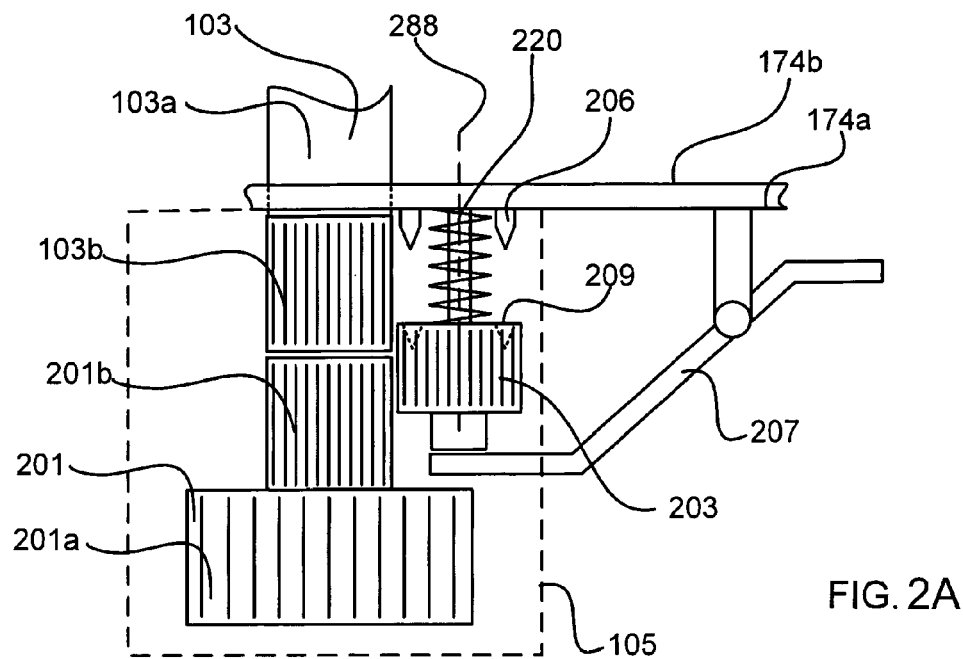
FIG. 2A illustrates internal details for the first clutch mechanism, in an engaged mode of operation.

Referring to FIG. 2a, internal details are illustrated for the first clutch mechanism 105, which is identical to the second clutch mechanism 106 and hence will not be described in detail. The illustration in FIG. 2a shows the first clutch mechanism 105 in an engaged mode of operation. Within the first clutch mechanism 105 a first drive gear 201 having a first gear portion 201a and a stepped gear portion 201b and is rotatably mounted for receiving actuation from the first drive actuator 110 (not shown). The first drive actuator comprises gear teeth for meshing with gear teeth of the first gear portion 201a. A first pinion gear 203 is coupled between the first appendage gear 103 and the stepped portion 201b of the first drive gear 201. The first pinion gear 203 is mounted within the clutch mechanism such that it both translates along a first pinion gear axis 288 and for rotating about the first pinion gear axis 288.

Figure 2B:
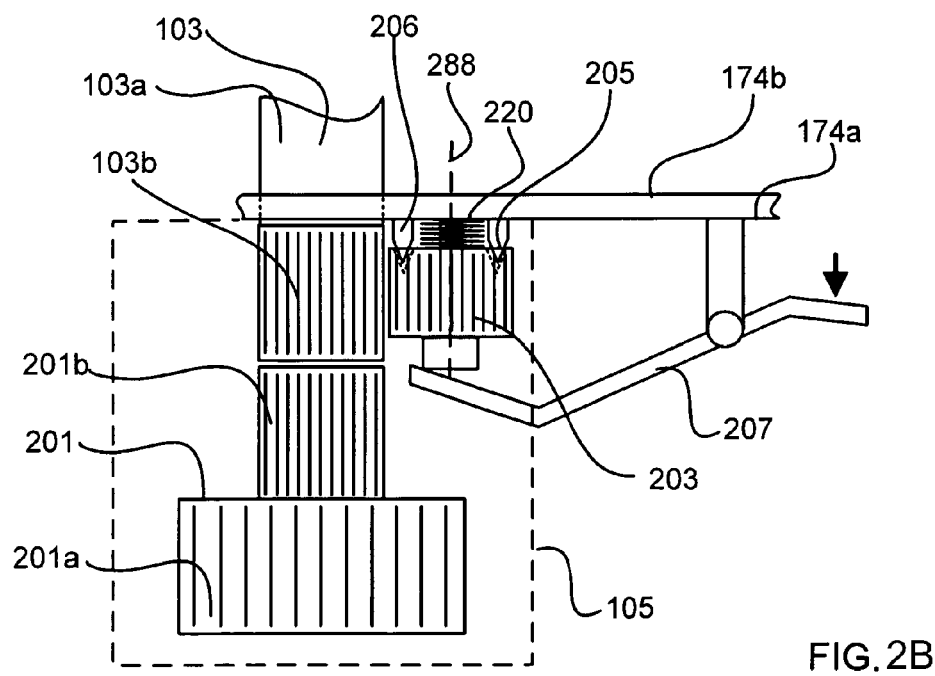
FIG. 2B illustrates internal details for the first clutch mechanism in an disengaged mode of operation.

Referring to FIG. 2b, the first pinion gear 203 is shown as being coupled only with the first appendage gear 103. In this case, the first clutch mechanism 105 is shown in the disengaged mode of operation. Conversely, in the engaged mode of operation as shown in FIG. 2a, the first pinion gear 203 couples actuation between the first drive gear 201 and the first appendage gear 103. Preferably the coupling of the actuation between the first drive gear 201 and the first appendage gear 103 is performed by a meshing of gear teeth, such as via the first pinion gear 203 shown in FIG. 2a.

In addition, the first clutch mechanism 105 is provided with a first locking mechanism 205, where the first locking mechanism 205 is for locking a position of the first appendage assembly 101 by preventing rotation of the first appendage gear 103 when in the disengaged mode of operation. Locking of the first appendage gear 103 is performed by having the first pinion gear 205 engage a first set of locking teeth 206 that are disposed on, and generally extend from the interior surface of the housing 174a. A first set of apertures 209 formed within the first pinion gear 203 are engaged by the first set of locking teeth 206 for preventing rotation of the first pinion gear 203 in response to a reasonable external force applied to the first appendage assembly 101 where this reasonable external force is approximately equal to a weight of the robot 100. Preferably in the disengaged mode of operation, the first pinion gear 203 is prevented from rotating in response to the reasonable external force applied to the first appendage 107.

A first lever arm 207 is utilized for translating of the first pinion gear 203 along the first pinion gear axis 288. The first pinion gear 203 is translated between meshing with the first drive gear 201 and the first appendage gear 103 such as in the engaged mode of operation shown in FIG. 2a, and meshing with the first appendage gear 103 and the first locking mechanism 205 such as in the disengaged mode of operation shown in FIG. 2b. The first lever arm 207 is additionally coupled with the selective engagement mechanism 111 (not shown in FIGS. 2a and 2b). A second lever arm 217 (FIG. 3a) performs an identical function to the first lever arm 207 and is used to control the mode of operation of the second clutch mechanism 106 and hence will not be described in detail.

FIG. 3a illustrates the selective engagement mechanism 111, where the selective engagement mechanism 111 is in a first engagement state. The selective engagement mechanism 111 is formed from at least two engagement gears, where a first engagement gear 301 comprises a first geometric feature 301a for displacing the first lever arm 207 and a second engagement gear 302 comprises a second geometric feature 302a for displacing the second lever arm 217, wherein the displacement of the first and second lever arms, 207 and 217, changes the operating mode of respective first and second clutch mechanisms, 105 and 106.

As is shown in FIG. 2a, preferably a first spring 220 is coupled with the first lever arm 207 for opposing displacement of the first lever arm 207 and for controlling interaction between the first lever arm 207 and the first geometric feature 301a, where the first spring 220 preferably provides a force that presses the first lever arm 207 against the first engagement gear 301. A second spring (not shown) has an exact function as the first spring 220 and is used for controlling interaction between the second lever arm 217 and the second engagement gear 302.

A selective engagement mechanism actuator 303 is utilized for actuating of the first and second engagement gears, 301 and 302. Both first and second clutch mechanisms, 105 and 106, are in the engaged mode of operation in that shown in FIG. 3a since both the first and second lever arms, 207 and 217, are positioned within the first and second geometric features, 301a and 302a. The selective engagement mechanism actuator 303 comprises a selective engagement actuator input port 303a for receiving a selective engagement control signal, where the selective engagement control signal is for controlling the engagement state of the selective engagement mechanism 111.

Figure 3B:
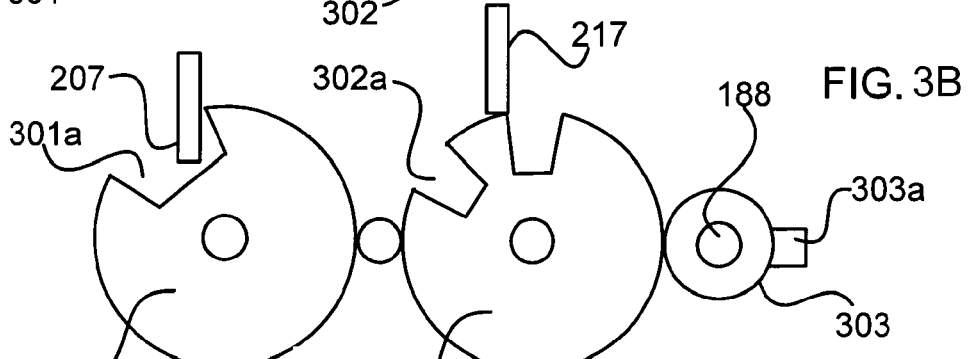
FIG. 3B illustrates the selective engagement mechanism in a second state.

FIG. 3b illustrates the first and second engagement gears 301 and 302, where the first lever arm 207 is positioned within the first geometric feature 301a and the second lever arm 217 is other than positioned within the second geometric feature 302a. In this case the first clutch mechanism 105 is in the engaged mode of operation and the second clutch mechanism 106 is in the disengaged mode of operation when the selective engagement mechanism 111 is in a second engagement state.

Figure 3C:
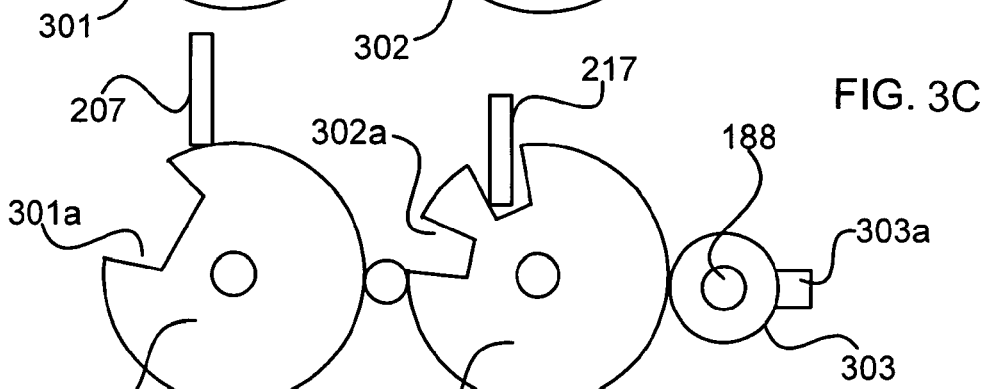
FIG. 3C illustrates the selective engagement mechanism in a third state.

FIG. 3c illustrates the first and second engagement gears 301 and 302, where the first lever arm 207 is other than positioned within the first geometric feature 301a and the second lever arm 217 is positioned within the second geometric feature 302a. In this case the first clutch mechanism 105 is in the disengaged mode of operation and the second clutch mechanism 106 is in the engaged mode of operation when the selective engagement mechanism 111 is in a third engagement state.

Figure 3D:
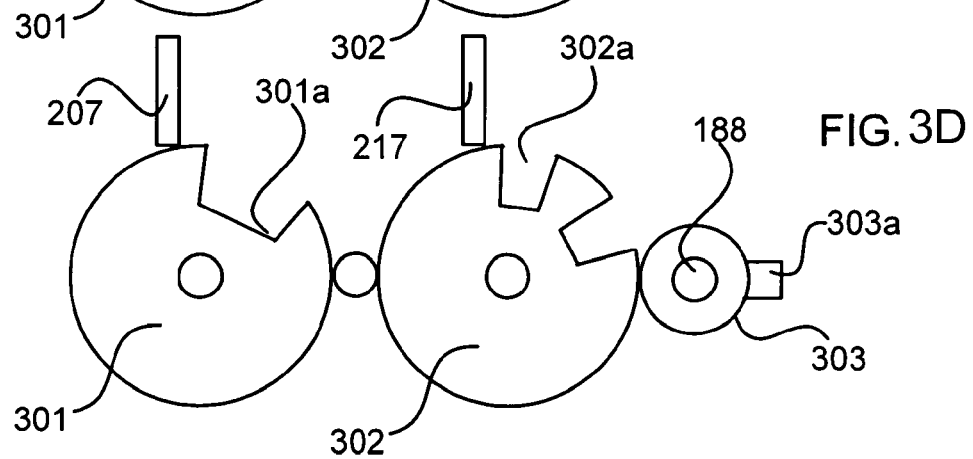
FIG. 3D illustrates the selective engagement mechanism in a fourth state.

FIG. 3d illustrates the first and second engagement gears 301 and 302, where the first lever arm 207 is other than positioned within the first geometric feature 301a and the second lever arm 217 is other than positioned within the second geometric feature 302a. In this case the first clutch mechanism 105 is in the disengaged mode of operation and the second clutch mechanism 106 is in the disengaged mode of operation when the selective engagement mechanism 111 is in a fourth engagement state.

The clutch engagement data is for encoding a current state of engagement of the selective engagement mechanism 111. In addition, the first and second geometric features, 301a and 302a, are formed within the respective engagement gears, 301 and 302, Transitioning from one engagement state to another engagement state of the selective engagement mechanism 111 is potentially a sequential operation, however, the selective engagement mechanism 111 changes the engagement from a first engagement state to a second engagement state in dependence upon the selective engagement control signal, where the first and second engagement states need not be sequential with respect to positioning of the geometric features of the engagement gears. Through rotation of the first and second engagement gears, 301 and 302, the engagement mechanism 111 transitions through one of four engagement states. In some cases, transitioning from one engagement state to another engagement state passes through an intermediate state. In this case, preferably little time is spent in transitioning through the intermediate state.

Referring to FIGS. 4a through 4d, a variation of mechanical internals of the selective engagement mechanism 111 is shown, but the function thereof is similar to that shown in FIGS. 3a through 3b. In this case the selective engagement mechanism utilizes the selective engagement actuator 303 for providing of linear actuator to a linear slider 499 to displace the first lever mechanism 207, a second lever mechanism 327 and a third lever mechanism 257, where referring to FIG. 6a, the lever mechanisms correspond to the first, third and fifth clutch mechanisms, 105 and 105a and 105b, respectively Labeling on the FIG. 4a "1D" denotes a linear displacement of one unit for the selective engagement actuator 303, where for example the label "2D" denotes two units of linear displacement of the linear slider 499. With respect to FIG. 4a, all three clutch mechanisms, 105, 105a and 105b are in the engaged mode of operation. Referring to FIG. 4b, only the first clutch mechanism 105 is in the engaged mode of operation. FIG. 4c illustrates the fifth clutch mechanism 105b being in the engaged mode of operation and FIG. 4d illustrates the third clutch mechanism 105a being in the engaged mode of operation. In this case, the selective engagement actuator 303 responds to the selective engagement control signal to bi directionally position the linear slider 499 as indicated in FIGS. 4a through 4d.

Figure 5A:
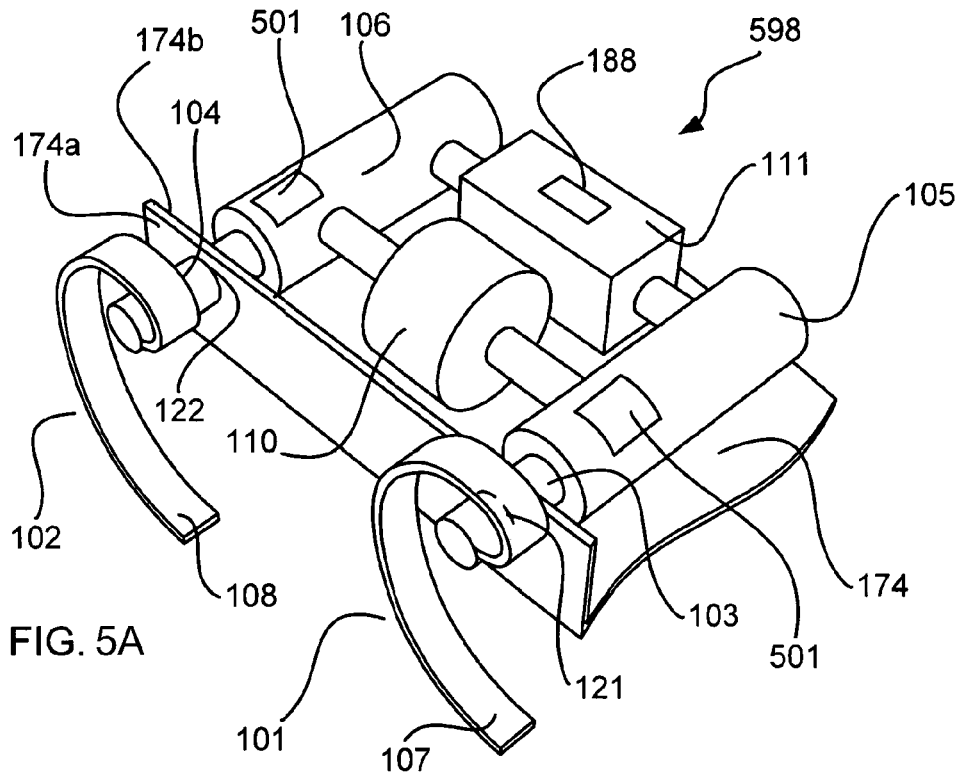
FIG. 5A illustrates portion of the legged robot that utilizes an appendage position sensor coupled with at least an appendage gear.

Referring to FIG. 5a, in this embodiment a portion of the legged robot 598 utilizes an appendage position sensor 501, where the appendage position sensor 501 is coupled with at least one of the first appendage gear 103 and the second appendage gear 104 for providing at least a first appendage position data. This at least a first appendage position data is an absolute position of the appendage and it is derived from one of a relative rotational angle and an absolute rotational angle of the at least one of the first appendage gear and second appendage gear, 103 and 104.

In the case where the appendage position sensor 501 utilizes a relative rotation sensor, such as an optical encoder, a homing sensor or a homing algorithm is used in conjunction in order to provide an absolute reference for the first appendage position data. In the case when the appendage positioning sensor 501 utilizes an absolute rotation sensor, such as a variable resistor, then the absolute position of at least one of the first appendage gear 103 and the second appendage gear 104 is determinable without the use of a homing algorithm or a homing sensor. In this embodiment, an appendage positioning sensor 501 is provided for each appendage for the robot so that the absolute position of each appendage is known. Of course, providing of a single appendage positioning sensor is also envisaged.

Figure 5B:
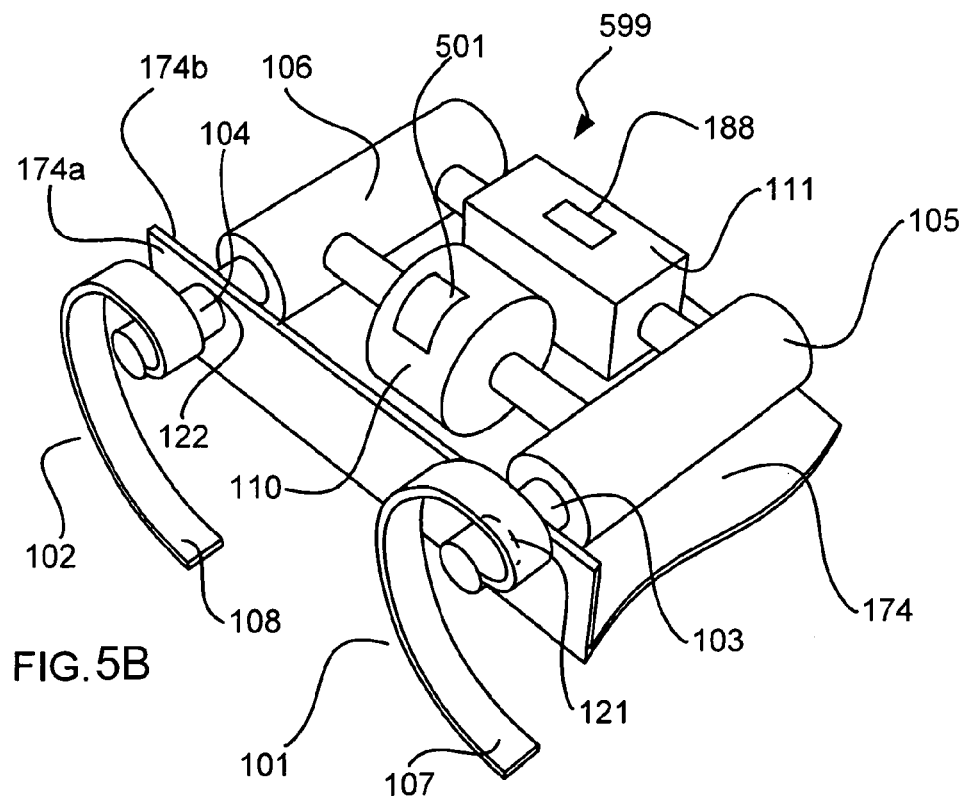
FIG. 5B illustrates portion of the legged robot that utilizes an appendage position sensor coupled with a drive actuator.

Referring to FIG. 5b, in this embodiment a portion of the legged robot 599 utilizes the appendage position sensor 501 coupled with the first drive actuator 110. Through this type of arrangement, when the first drive actuator 110 is selectively coupled with a respective appendage assembly, the first appendage position data is derived from movement of the appendage assembly when actuated by the first drive actuator 110. For example, the first drive actuator 110 is coupled with the first appendage assembly 101 and the homing algorithm is executed, the position of the appendage is determined and provided as the first appendage position data.

Figure 6A:
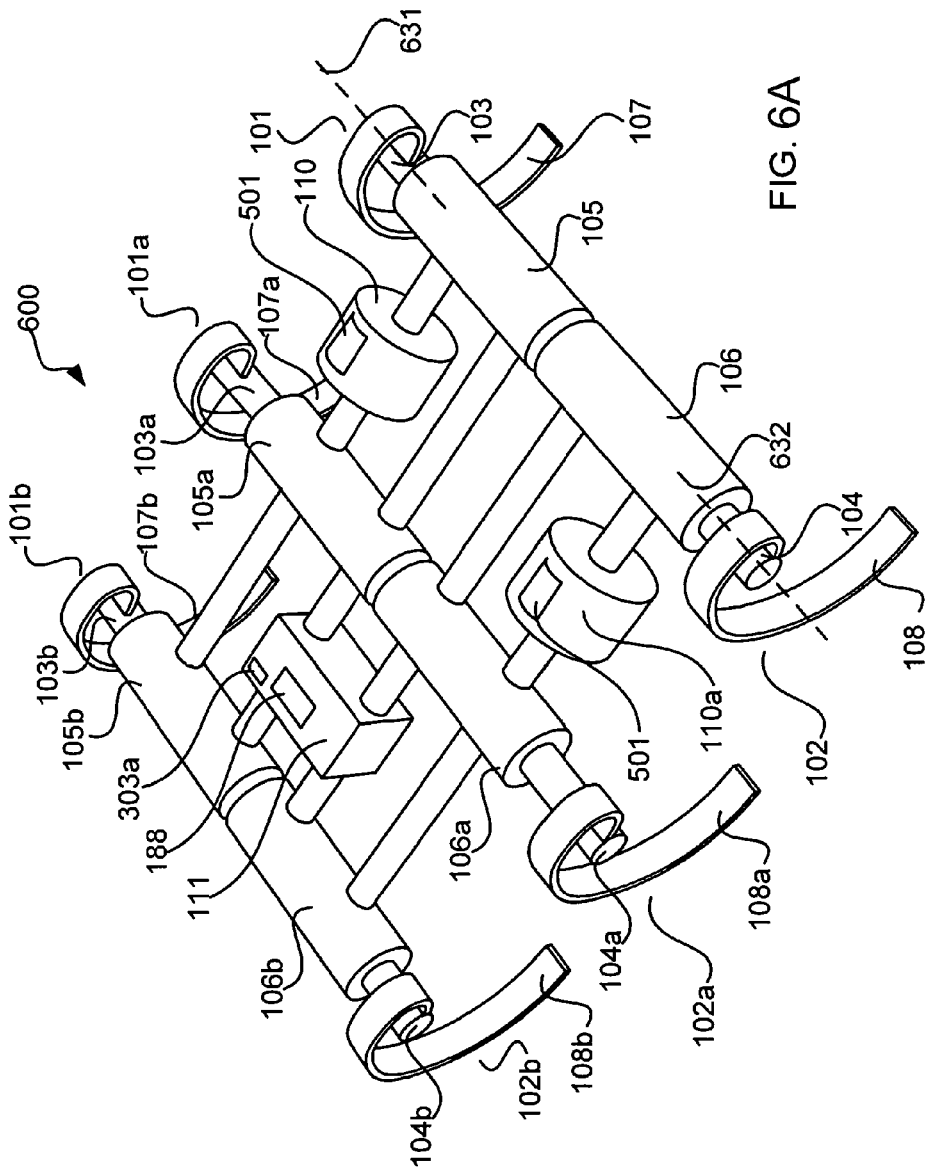
FIG. 6A illustrates a robot platform in accordance with a third embodiment of the invention.

FIG. 6a illustrates a robot 600 platform in accordance with a third embodiment of the invention. FIG. 6b illustrates a robot 699 in accordance with a fourth embodiment of the invention. Forming main components of the robot 600 and 699 with respect to the third and fourth embodiments of the invention is the first appendage assembly 101, which includes a first appendage 107 and the first appendage gear 103. The first appendage gear 103 extends from within the first clutch mechanism 105 and is coupled with the first appendage 107 for actuating thereof. The second appendage assembly 102, which includes a second appendage 108 and the second appendage gear 104. The second appendage gear 104 extends from within the second clutch mechanism 106 and is coupled with the second appendage 108. The first and second appendage assemblies 101 and 102 are oriented such that they are on opposite sides of the robot 600 and where the first appendage gear 103 comprises a first rotational axis 631 and the second appendage gear 104 comprises a second rotation axis 632, where the first and second rotational axes 631 and 632 are approximately coaxial with each other.

In addition, for the robot 600, there is provided is a third appendage assembly 101a, which includes a third appendage 107a and a third appendage gear 103a. The third appendage gear 103a extends from within the third clutch mechanism 105a and is coupled with the third appendage 107a for actuating thereof. A fourth appendage assembly 102a, which includes a fourth appendage 108 and the fourth appendage gear 104a. The fourth appendage gear 104a extends from within the fourth clutch mechanism 106a and is coupled with the fourth appendage 108a. The third and fourth appendage assemblies, 101a and 102a, are oriented such that they are on opposite sides of the robot 600 and where rotational axes of the third and fourth appendage gears 103a and 104a are approximately coaxial with each other.

Further, there is provided a fifth appendage assembly 101b, which includes a fifth appendage 107b and a fifth appendage gear 103b. The fifth appendage gear 103b extends from within the fifth clutch mechanism 105b and is coupled with the fifth appendage 107b for actuating thereof. A sixth appendage assembly 102b, which includes a sixth appendage 108b and the sixth appendage gear 104b. The sixth appendage gear 104b extends from within the sixth clutch mechanism 106b and is coupled with the sixth appendage 108b. The fifth and sixth appendage assemblies, 101b and 102b, are oriented such that they are on opposite sides of the robot 600 and where rotational axes of the fifth and sixth appendage gears 103b and 104b are approximately coaxial with each other.

The first drive actuator 110 is coupled with the first, third and fifth clutch mechanisms, 105 and 105a and 105b, for being selectively coupled with the first, third and fifth appendage assemblies, 101 and 101a and 101b. A second drive actuator 110a, having a similar function to the first drive actuator 110, is coupled with the second, fourth and sixth clutch mechanisms, 106 and 106a and 106b, for being selectively coupled with the second, fourth and sixth appendage assemblies, 102 and 102a and 102b. The first, third and fifth appendage assemblies, 101 and 101a and 101b, form a first appendage group and the second, fourth and sixth appendage assemblies, 102 and 102a and 102b, form a second appendage group. The selective engagement mechanism 111 is coupled with the first through sixth clutch mechanisms, 105, 106, 105a, 106a, 105b, 106b, for selecting the mode of operation for each of the clutch mechanisms in dependence upon a provision of the selective engagement control signal to the selective engagement actuator input port 303a. For clarity, the housing 174 is not shown in this FIG. 6a.

Referring to a robot 699 shown in FIG. 6b, the first drive actuator 110 is coupled with the first, third, fifth and sixth clutch mechanisms, 105 and 105a and 105b and 106b, for being selectively coupled with the first, third, fifth and sixth appendage assemblies, 101 and 101a and 101b and 102b. The second drive actuator 110a is coupled with the second and fourth clutch mechanisms, 106 and 106a for being selectively coupled with the second and fourth appendage assemblies, 102 and 102a. In this embodiment, the first, third, fifth and sixth appendage assemblies, 101 and 101a and 101b and 102b, form a first appendage group and the second and fourth appendage assemblies, 102 and 102a, form a second appendage group. The selective engagement mechanism 111 is coupled with the first through sixth clutch mechanisms for selecting the mode of operation for each of the clutch mechanisms. The first appendage gear 103 comprises a first rotational axis 631 and the second appendage gear 104 comprises a second rotation an axis 632, where the first and second rotational axes 631 and 632 are approximately parallel with each other. For clarity, the housing 174 is not shown in this FIG. 6b.

Advantageously, each of the appendage assemblies from within the first and second appendage groups is individually selectable for being actuated by its respective first and second drive actuator by provision of the selective engagement control signal to the selective engagement actuator input port 303a.

Figure 7:
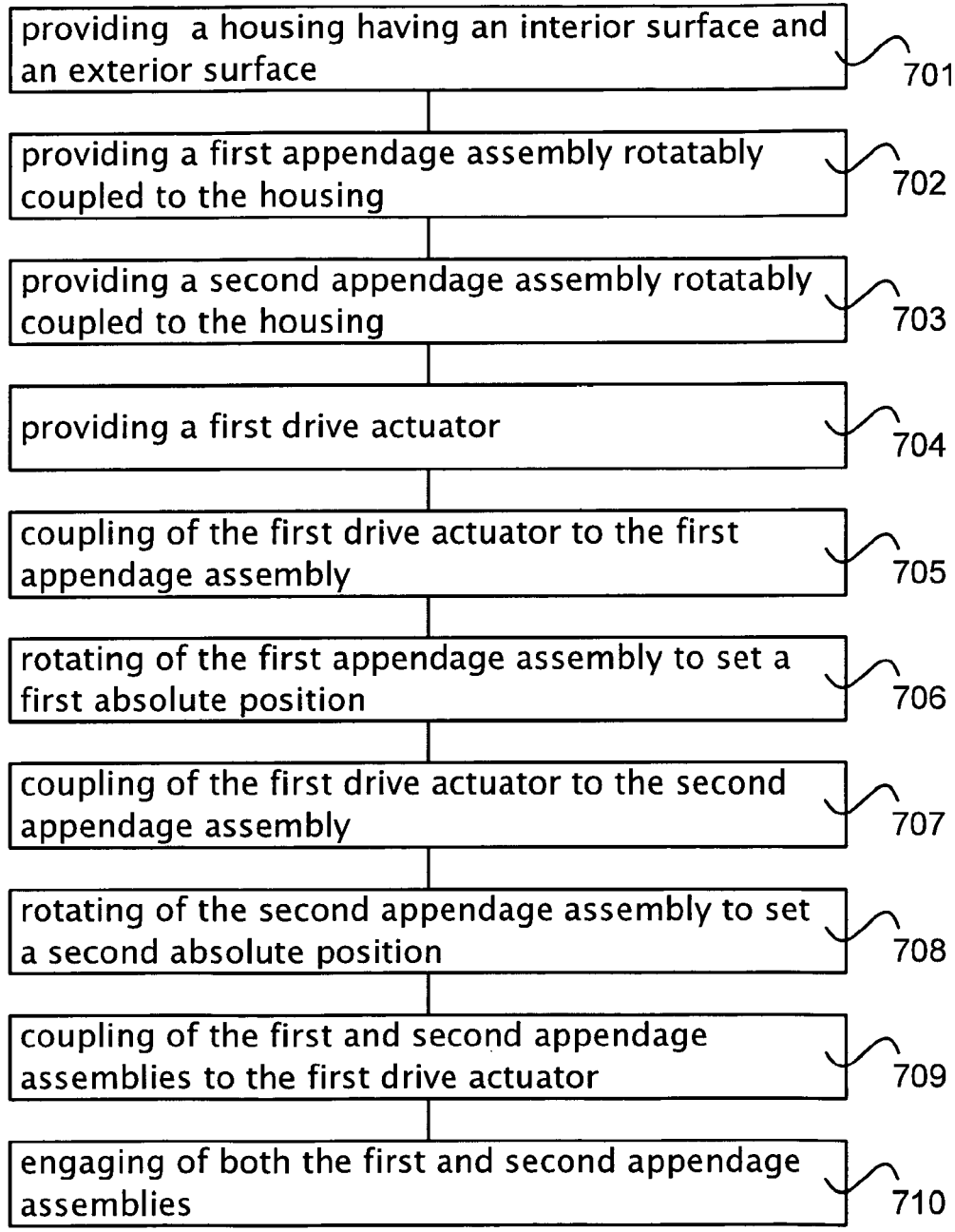
FIG. 7, illustrates a method of generating a propagation gait for a robot in accordance with the embodiments of the invention.

Referring to FIG. 7, a method of generating a propagation gait for a robot is shown. In a first step, 701, a housing having an interior surface and an exterior surface is provided. In a second step, 702, a first appendage assembly rotatably coupled to the housing is provided and in a third step 703 a second appendage assembly rotatably coupled to the housing is provided. With respect to a fourth step 704, a drive actuator is provided and in a fifth step, 705, the drive actuator is coupled to the first appendage assembly. Next, in step 706, the first appendage assembly is rotated to set a first absolute position, where in the following step, 707, the first drive actuator is coupled to the second appendage assembly. The second appendage assembly is then rotated to set a second absolute position, in step 708. Thereafter, in step 709, coupling of the first and second appendage assemblies to the first drive actuator is performed. Referring to step 710, engaging of both the first and second appendage assemblies takes place. The propagation gait for the robot will then be dependent upon a phase relationship between the first and second absolute positions.

It is advantageous to have the appendage position sensor 501 coupled with the first drive actuator 111, as is shown in FIG. 5b, as using less appendage positioning sensors reduces the cost of the robot, 600 or 699. Having a plurality of appendage positioning sensors for each appendage increases robot cost and is not advantageous.

Unfortunately, in such a case, because the absolute position of each appendage is unknown upon power up of the robot, 600 or 699, a homing procedure is implemented in order to determine an absolute position of each appendage, such as that indicated in steps 705 and 706. When the appendage that is coupled to the first drive actuator is rotated, it is moved in a predetermined a direction and to a predetermined position in accordance with a predetermined homing algorithm.

This predetermined position is either to a movement limit where the appendage cannot move any further because it is restricted from motion by the housing 174 or a homing sensor is utilized where the appendage is moved until the homing sensor is actuated. The at least a first appendage position data is then derived from the absolute position of the coupled appendage and is stored in a memory circuit in conjunction with the clutch engagement data. After the absolute position of the coupled appendage is determined, the coupled appendage is uncoupled from the first drive mechanism and it is locked in place using the locking mechanism. Thereafter the other of the first and second appendage assemblies is coupled with the first drive actuator 111 for determining the position thereof.

Upon completion of the homing procedure, absolute positions of the first and second appendages are known. As such, further operations to the positions of the first and second appendages, such as changing their phase relationships, utilize the at least a first appendage position data. So, for example, for the embodiment shown in FIG. 5b, the at least a first position data is in the form of a first position data and a second position data where this data relates to the absolute position of the first and second appendages and is stored in relation to the clutch engagement data in the memory circuit. Even during coupling and uncoupling of the first drive actuator, the first position data and the second position data are updated for the first and second appendages.

Referring to the embodiment shown in FIG. 6a and referring to FIG. 4b, the first and second clutch mechanisms, 105 and 106, are in the engaged mode of operation and the third through sixth clutch mechanisms, 105a, 106a, 105b, 106b, are in the disengaged mode of operation, thus allowing for the first and second drive actuators, 110 and 110a, to be used for determining the position of the first and second appendages, 107 and 108, in accordance with the steps outlined in FIG. 7. Referring to FIG. 4c, first through fourth clutch mechanisms, 105, 106, 105a, 106a, are in the disengaged mode of operation and the fifth and sixth clutch mechanisms, 105b, 106b, are in the engaged mode of operation, thus allowing for the first and second drive actuators, 110 and 110a, to be used for determining the position of the fifth and sixth appendages, 107b and 108b. Referring to FIG. 4d, only the third and fourth clutch mechanisms, 105a, 106a, are in the engaged mode of operation and as such the first and second drive actuators, 110a, 110b, are used for determining the position of the third and fourth appendages, 107a and 108a. Referring to FIG. 4a, all six of the clutch mechanisms, 105, 105a, 105b, 106, 106a, 106b are in the engaged state and upon actuating of the first and second drive actuators, 110, 110a, the first and second appendage groups will preferably exhibit a walking gait for propagating the robot along a propagation surface.

With reference to the aforementioned embodiments of the invention, a robot with six appendages, or legs, such as the one shown in the third embodiment of the invention 600, has its appendages organized into groups of one to six appendages, whereby each group is actuated using a respective drive actuator, 110 and 110a, and the respective clutch mechanism for each appendage, which is actuated by at least one selective engagement mechanism actuator, for selectively disengaging one or more appendages at a time in such a manner that it preferably results in at least one appendage from the appendage group to be coupled with the respective drive actuator for that group.

Because each appendage has its respective clutch mechanism, this allows for reconfiguring of the robots limbs such that phase relationships between the limbs are variable and thus allowing for different propagation gaits and individual appendage animations.

A control circuit, which includes the memory circuit, is provided and is coupled with all of the actuators, such as the first drive actuator, the selective engagement mechanism position sensor 188, the appendage position sensor 501 and the selective engagement actuator input port. Within the control circuit, a software algorithm utilizes appendage position data to control a position and a velocity and a phase of each appendage from an appendage group. The software algorithm is then utilized for determining of the propagation gait for the robot, as shown in accordance with the embodiments of the invention.

Various propagation gaits are envisaged for the robot 600 in accordance with the third embodiment of the invention, FIG. 6a, as are explained hereinbelow:

A Standing propagation gait is achieved by starting with the housing 174 (not shown in FIG. 6a) resting on the ground, and actuating the appendages in the forward direction until the housing rises from the ground.

Walking, jogging and running propagation gaits are achieved in two ways. In one manner, the first appendage 107 is oriented to be 180 degrees out of phase with the second appendage 108. The first and second appendage groups are then actuated in a direction of motion and at a same constant speed. Actuation speed is then varied to transition from walking to jogging to running.

A turning propagation gait is achieved by increasing or decreasing the rotation speed of the appendages that are in contact with the ground or the propagation surface.

A swimming behavior is achieved by having a positively buoyant and watertight housing 174 and activating the walking behavior and turning by activating the appendages on a one side of the body only.

A bounding propagation gait is achieved by moving of the first and second appendages in the same orientation, standing the robot on its first, second, fifth and sixth appendages, with the third and fourth appendages not contacting the ground and actuating both first and second appendage groups in a reciprocating motion.

A climbing stairs propagation gait is achieved by first configuring the appendages so that first and second appendages have the same orientation, the third and fourth appendages have same orientation and are offset at a phase angle from 0 degrees up to 90 degrees with respect to the first and second appendages in the direction of the rotation of the appendages for forward propagation of the robot and the fifth and sixth appendages have the same orientation and are offset at a phase angle from 90 degrees up to 180 degrees with respect to the first and second appendages and in the direction of the rotation of the appendages in the direction of the rotation of the appendages for forward propagation of the robot.

A Pronking propagation gait is achieved by configuring all six appendages, 107, 107a, 107b, 108, 108a, 108b, to point in the same direction and actuating both appendage groups back and forth in a reciprocating motion.

Jumping and hopping propagation gaits are achieved by configuring all six appendages, 107, 107a, 107b, 108, 108a, 108b, to point in the same direction and actuating the appendages in the direction of motion at high speed while maintaining the appendage groups in the same phase. Actuating the appendages once produces jumping, more than once produces hopping.

A dancing propagation gait is achieved by moving the appendage groups independently, following two possibly different timed profiles, one for each appendage group of appendages.

Advantageously, the aforementioned propagation gaits are achieved for the robot with the use of three actuators. Typically in order to realize the same type of propagation gaits, six actuators are utilized. This results in a cost savings for manufacturing and sales. As well it provides for a robot that has lower power consumption as less actuators are utilized to achieve the propagation gaits in a highly reconfigurable platform. In addition, an appendage position sensor is used with the first drive actuator or second drive actuator, which reduces the cost of having a position sensor used for each appendage.

Furthermore, the embodiments of the invention are extendable to robot platform that have N appendages, where N is greater than one, and where the appendages are organized in groups of 1 to P appendages.

Numerous other embodiments are envisaged without departing from the spirit or scope of the invention.

What is claimed is:

1. A method of generating a propagation gait for a robot comprising:
   providing a housing having an interior surface and an exterior surface;
   providing a first appendage assembly rotatably coupled to the housing;
   providing a second appendage assembly rotatably coupled to the housing, providing a first drive actuator;
   coupling of the first drive actuator to the first appendage assembly;
   rotating of the first appendage assembly to set a first absolute position;
   coupling of the first drive actuator to the second appendage assembly;
   rotating of the second appendage assembly to set a second absolute position;
   coupling of the first and second appendage assemblies to the first drive actuator;
   rotating of both the first and second appendage assemblies.

2. A method according to claim 1 wherein coupling of the first drive actuator to the first appendage assembly comprises uncoupling of the first drive actuator from the second appendage assembly.

3. A method according to claim 2 comprising: providing a second locking mechanism, wherein uncoupling of the first drive actuator from the second appendage assembly comprises locking of the second appendage assembly by the second locking mechanism.

4. A method according to claim 1 wherein coupling of the first drive actuator to the second appendage assembly comprises uncoupling of the first drive actuator from the first appendage assembly.

5. A method according to claim 4 comprising: providing a first locking mechanism, wherein uncoupling of the first drive actuator from the second appendage assembly comprises locking of the first appendage assembly by the first locking mechanism.

6. A method according to claim 1 wherein rotating of one of the first appendage assembly and the second appendage assembly to set one of a first absolute position and a second absolute position, respectively, comprises rotating of one of the first appendage assembly and the second appendage assembly, respectively, in a predetermined direction and to a predetermined position.

7. A method according to claim 1 comprising:
   providing a selective engagement mechanism comprising a plurality of engagement states, wherein each of the plurality of engagement states is a coupling of the first drive actuator to at least one of the first and second appendage assemblies; and
   actuating of the selective engagement mechanism to couple the first drive actuator to at least one of the first and second appendage assemblies.

* * * * *